United States Patent
Webster (10) Patent No.: US 7,933,870 B1
(45) Date of Patent: Apr. 26, 2011

(54) MANAGING FILE INFORMATION

(75) Inventor: Roger R. Webster, San Martin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 302 days.

(21) Appl. No.: 11/249,194

(22) Filed: Oct. 12, 2005

(51) Int. Cl.
*G06F 7/00* (2006.01)
*G06F 17/00* (2006.01)

(52) U.S. Cl. ...................................................... 707/638

(58) Field of Classification Search .................. 705/59; 707/3, 999.003, 638

See application file for complete search history.

(56) References Cited

U.S. PATENT DOCUMENTS

| | | | | |
|---|---|---|---|---|
| 6,374,260 | B1 * | 4/2002 | Hoffert et al. | 707/104.1 |
| 6,654,746 | B1 * | 11/2003 | Wong et al. | 707/10 |
| 2002/0095416 | A1 * | 7/2002 | Schwols | 707/10 |
| 2005/0027718 | A1 * | 2/2005 | Sakaguchi et al. | 707/100 |
| 2005/0273698 | A1 * | 12/2005 | Smith et al. | 715/511 |
| 2006/0112018 | A1 * | 5/2006 | Lee | 705/59 |
| 2006/0294163 | A1 * | 12/2006 | Armangau et al. | 707/205 |

OTHER PUBLICATIONS

Rector, Brent. "Introducing 'Longhorn' for Developers." Jan. 2004. Chapter 4: Storage. MSDN: http://msdn.microsoft.com/library/default.asp?url=/library/en-us/dnintlong/html/longhornch04.asp.

* cited by examiner

*Primary Examiner* — Mohammad Ali
*Assistant Examiner* — Alexey Shmatov
(74) *Attorney, Agent, or Firm* — Van Pelt, Yi & James LLP (57) ABSTRACT

Managing file information is disclosed. In some embodiments, a first set of information associated with a file that includes an identifier is accessed. The identifier from the first set is read. If it is determined that at least one value in a second set of information associated with the identifier does not correspond with the file, the at least one value in the first and/or second set is updated. In some embodiments, the first set is associated with metadata attached to a file and the second set is associated with a corresponding database record. By comparing one or more of the information in the metadata attached to a file, information in the corresponding database entry, information associated with the actual file, information associated with other files, existence of other files, etc., it is possible to synchronize a database with associated files and make inferences about files that have undergone changes.

35 Claims, 9 Drawing Sheets

| Sequence Number | File Name | Path | Size (KB) | Hash | Creation Date |
|---|---|---|---|---|---|
| 1 | Photo.jpg | C:\My Pictures\Photo.jpg | 2802 | 3 | 02/06/03 |
| 2 | Song.mp3 | C:\My Music\Rock\Song.mp3 | 4507 | 12 | 06/02/05 |
| 3 | Report.doc | C:\Work\Report.doc | 81 | 7 | 09/17/04 |
| ... | | | | | |
| | | | | | |
| | | | | | |

MANAGING FILE INFORMATION

BACKGROUND OF THE INVENTION

Many applications employ databases or similar data structures to store information about particular files or types of files. Each of the database records comprising the database corresponds to a particular file. As information about a file is added to a database record, the database record is assigned an identifier that may be used to identify the record within the database, for example, during operations within the database. For instance, as each database record is added to the database, it may be assigned a monotonically increasing counting number as an identifier. Typically, such an identifier is not associated with and does not identify the actual file to which the database record corresponds.

A file associated with a database record may undergo any change or combination of changes such as being moved to a different storage location, renamed, copied to another file, deleted, subjected to content modification, etc. If such a change occurs within an associated application of the database, the corresponding database record can be automatically updated so that the information stored in the record is synchronized with actual file information. However, if such a change is made outside of an associated application of the database, such as via a primary user interface of an operating system (e.g., WINDOWS EXPLORER), automatically tracking such a change is often not possible, resulting in a corresponding database record becoming disconnected from the file to which it refers. Since it may not always be possible to automatically identify the file to which a disconnected database record corresponds, some level of user input is often necessary to reconnect the disconnected database record to its associated file. Moreover, once a file has undergone one or more of the aforementioned operations, it is typically not possible to at least automatically determine how the file has changed with respect to its previous or original state recorded in its corresponding database record. Knowledge of how a file has changed would be useful to update the database. For instance, if one or more copies of a file are created, it would be useful to be able to automatically identify the copies and create new records in the database for the copies.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing file information is disclosed. In some embodiments, a first set of information associated with a file that includes an identifier is accessed. The identifier from the first set is read. If it is determined that at least one value in a second set of information associated with the identifier does not correspond with the file, the at least one value in the second set is updated. In some embodiments, if it is determined that the first set also includes the at least one value, the at least one value is also updated in the first set of information. In some embodiments, the first set is associated with metadata attached to a file and the second set is associated with a corresponding database record. By comparing one or more of the information in the metadata attached to a file, information in the corresponding database entry, information associated with the actual file, information associated with other files, existence of other files, etc., it is possible to keep a database synchronized with associated files and make inferences about files that have undergone one or more changes.

Figure 1:
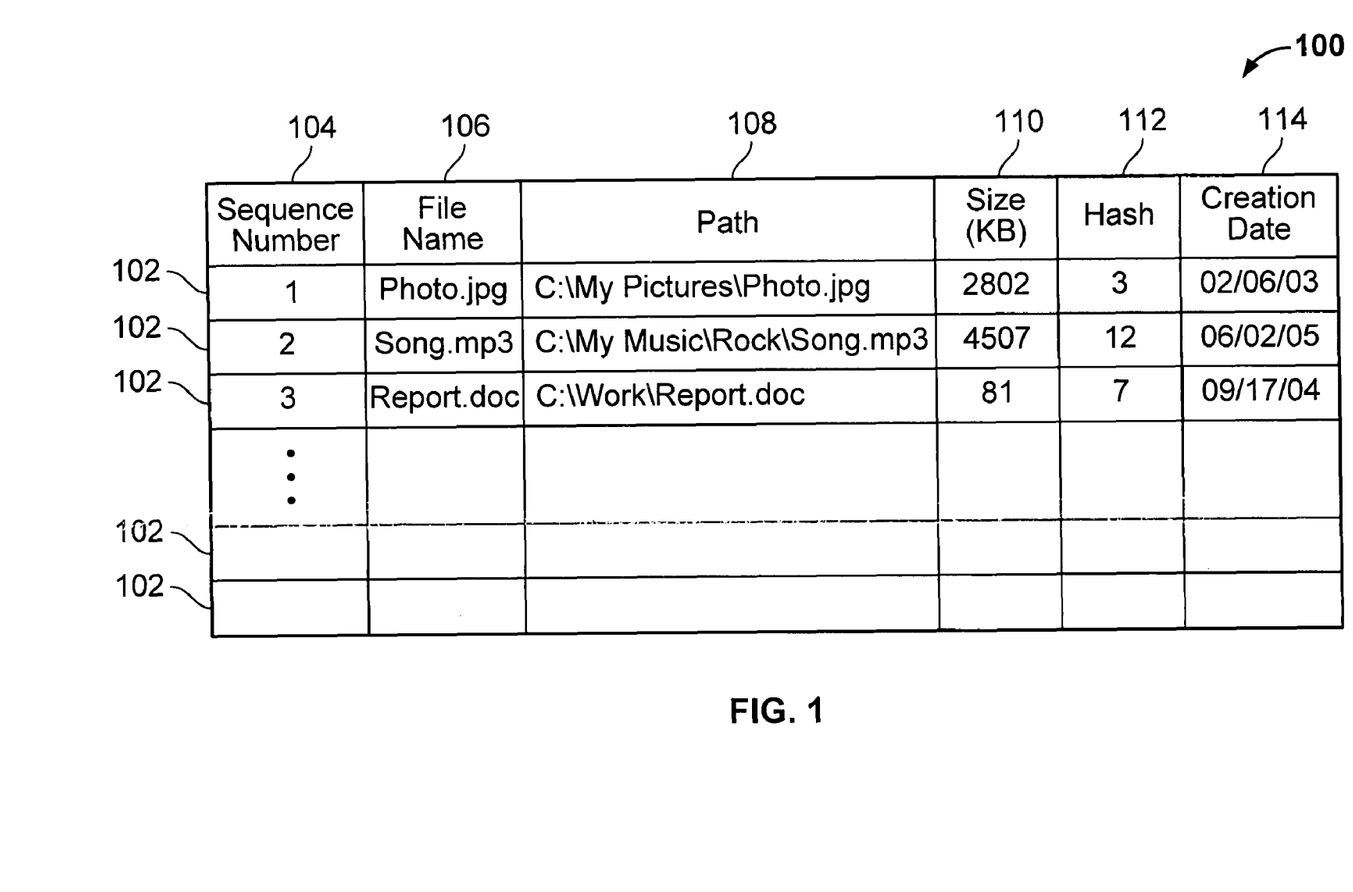
FIG. 1 illustrates an example of a manner in which information associated with a set of files is typically stored in a table.

FIG. 1 illustrates an example of a manner in which information associated with a set of files is typically stored in a table. Table 100 may be a part of an application and/or any storage mechanism for storing information about files such as a database, a file system, etc. Each row 102 of table 100 is associated with a single file. Information about any one or more files or specific types of files may be stored in table 100. For example, table 100 may be used to store file information about a set of photographs, or table 100 may be employed to store file information about a play list of songs. The columns of table 100 are associated with file attributes. As depicted, attributes 104-114 correspond to the sequence number assigned to a file, the file name, path (which may include the file name), size, hash, and creation date, respectively. Any other file attributes, such as author, modification date and/or time, key words, version history, copyright notices, etc., may also be included in addition to or instead of some of the attributes presented in table 100. As shown in the given example, a sequence number 104 is assigned to each file record as it is added to table 100. The sequence number 104 assigned to each record may be used, for example, as a key in a database. Although the sequence number 104 may be used to identify a record in table 100, it is not attached to or associated with the actual file to which the record corresponds to in this example.

Although a database may be described, any appropriate data structure and associated application may be used to record and manage information about one or more files or types of files. In some cases, a database is built to reflect one or more files or types of files on disk and/or on other forms of storage. In some cases, a database is built to reflect one or more files or types of files stored across a network, such as a LAN. If the path of a file recorded in a database and the actual location of the file do not match because, for instance, the file has been moved, renamed, copied, deleted, or modified in such a manner that the corresponding database application was unable to track the changes and appropriately update the corresponding database entry, for example, because the changes occurred outside of the application (e.g., via WINDOWS EXPLORER), the database entry becomes disconnected from its corresponding file. Typically, reconnecting a disconnected database record involves scanning available files using a heuristic or search.

If one or more attributes of a file match corresponding attributes recorded in a disconnected database record, the file may be deemed a likely match with the disconnected record. For example, if a file is moved to a different directory, the path is different, but the rest of the file attributes, such as the file name, size, hash, creation date, etc., stored in the disconnected database record may match those of the actual file. Thus, in some cases, a matching file may be easily located by employing an appropriate heuristic or search. When a disconnected database record is reconnected, the affected fields of the database record are updated so that the information stored in the database record is synchronous with information associated with the actual file. However, if a file undergoes more complex changes such as a move, rename, and/or content modification, many or all of the attributes stored for the file in the corresponding database record may no longer match actual file attributes, and it may be difficult to locate the correct file and repair the disconnected database record.

Since there often exists some degree of uncertainty in determining whether a particular file corresponds to a disconnected database record, reconnection processes are often not fully automated and entail some level of user input. For example, a user may be prompted to verify that a particular file corresponds to a broken database record before the affected fields in the database record are updated to match those of the actual file. When several files are possible candidates, a user may be prompted to select the file that corresponds to the disconnected database record. If a heuristic or search does not result in any potential candidates for a disconnected database record, a user may have to manually select the correct file to reconnect with the disconnected database record. If a file has been deleted, a user may have to recall that the particular file was deleted and provide input to specify that the file was deleted so that the corresponding database entry can be purged.

It is, therefore, useful and more reliable to be able to automatically update a database record, if necessary, when its associated file undergoes a change. Moreover, it is useful to be able to deduce how a file has changed, e.g., if the file has been moved, renames, deleted, copied, or subjected to some other modification. In some embodiments, this can be accomplished by attaching a unique identifier and other relevant file attributes to each file in a persistent manner so that such information is associated with the file across file operations as well as across file systems and/or operating systems. Attaching information to a file and employing at least some of that information to track or identify the file, for example, to maintain a database record and its associated file in synchronization, to make inferences about a file, etc., is disclosed herein.

Figure 2:
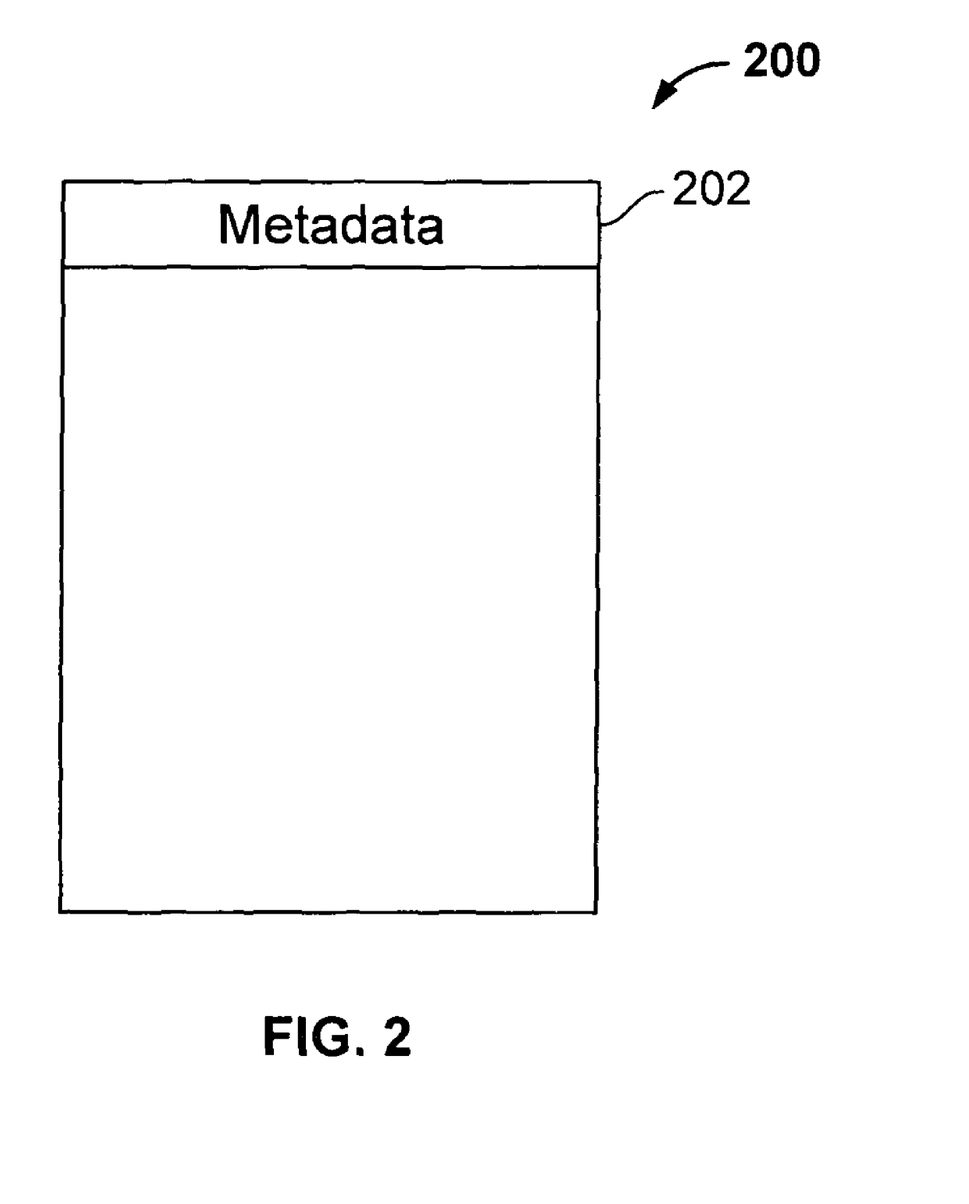
FIG. 2 illustrates an example of a file to which information related to the file is attached.

FIG. 2 illustrates an example of a file to which information related to the file is attached. In some embodiments, the information attached to file 200 is in the form of metadata 202. In some embodiments, metadata 202 is directly written into file 200, for example, in a predetermined position such as a header. In some embodiments, metadata 202 is embedded into file 200, for example, by using Adobe's Extensible Metadata Platform (XMP). In some embodiments, metadata 202 is included in a separate, ancillary file that is permanently associated with and travels with file 200, for example, by using the Alternate Data Stream (ADS) functionality of Microsoft's NT file system. In some embodiments, metadata 202 is incorporated into a resource fork associated with a MACINTOSH file 200. Any suitable mechanism or combination of mechanisms to associate metadata 202 with a file 200 may be employed. Metadata 202 associated with a file 200 may be added, modified, or updated at any point during the life of the file 200, for example, at creation, during an edit, when a file is entered into an application or database, when a file is included in a file system, etc.

In some embodiments, enough information is written into the metadata 202 of file 200 so as to allow a database record that refers to file 200 to be automatically updated and corrected when file 200 undergoes a change. Moreover, some of the information recorded in metadata 202 may allow deductions to be made about file 200. For example, if an original or a previous name and location of file 200 are recorded in metadata 202, inferences can be made about whether file 200 is an original, an original that has moved or been renamed, a copy, etc. Metadata 202 associated with file 200 may include any information related to the file 200 and/or its attributes, such as the file name, path, size, hash, creation date and/or time, modification date and/or time, author, version history, etc., some of which may also be stored in an associated database entry. In some embodiments, the metadata 202 associated with a file 200 includes a globally unique identifier (GUID) to uniquely and persistently identify file 200. The GUID and other relevant file information stored in metadata 202 may be used to maintain an associated database entry and an actual file 200 in synchronization.

Figure 3:
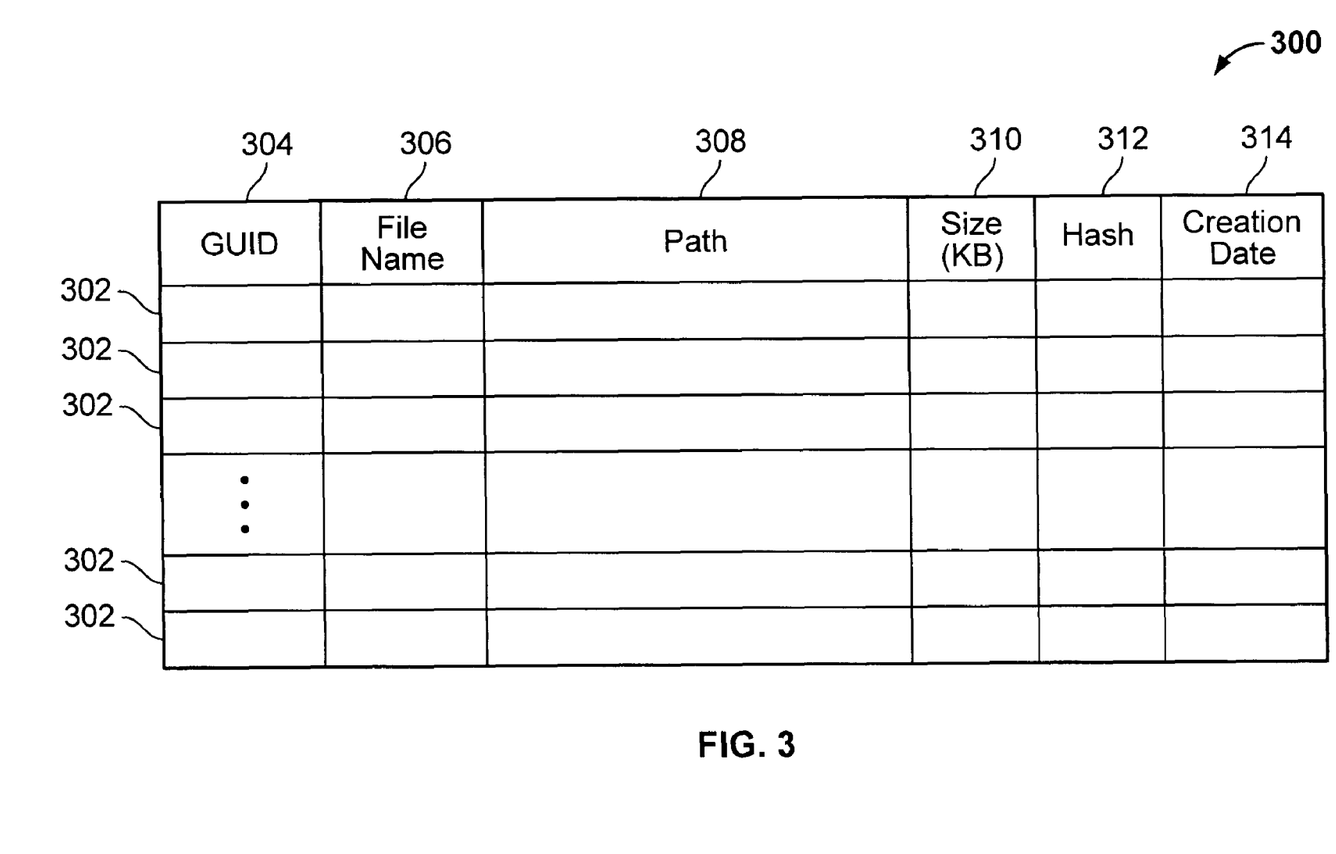
FIG. 3 illustrates an example of a manner in which information associated with a set of files may be stored in a table.

FIG. 3 illustrates an example of a manner in which information associated with a set of files may be stored in a table. Table 300 may be a part of an application and/or any storage mechanism for storing information about files such as a database, a file system, etc. Each row 302 of table 300 is associated with a single file, and each column of table 300 is associated with a file attribute. In this example, table 300 parallels table 100 with the exception that GUID 304 in table 300 replaces sequence number 104 in table 100 of FIG. 1. Attributes 306-314 parallel attributes 106-114 of table 100. Other attributes instead of or in addition to attributes 304-314 may be included in table 300. The GUID 304 may be used instead of or in addition to the sequence number 104 of FIG. 1 to uniquely identify a database entry and may serve as a key for lookup in the database. In some embodiments, GUID 304 is assigned to a file and added to file metadata when the file is entered into table 300. Any technique known in the art to generate a globally unique identifier may be employed to generate GUID 304. In some embodiments, GUID 304 is based on file content and/or other information associated with the file. In some embodiments, GUID 304 is not merely based upon a location, address, or pointer associated with the file, such as a URL, URI, or an index in a file accessing system. GUID 304 uniquely identifies a file on a particular machine, and in some embodiments, GUID 304 uniquely identifies a file across machines.

Figure 4:
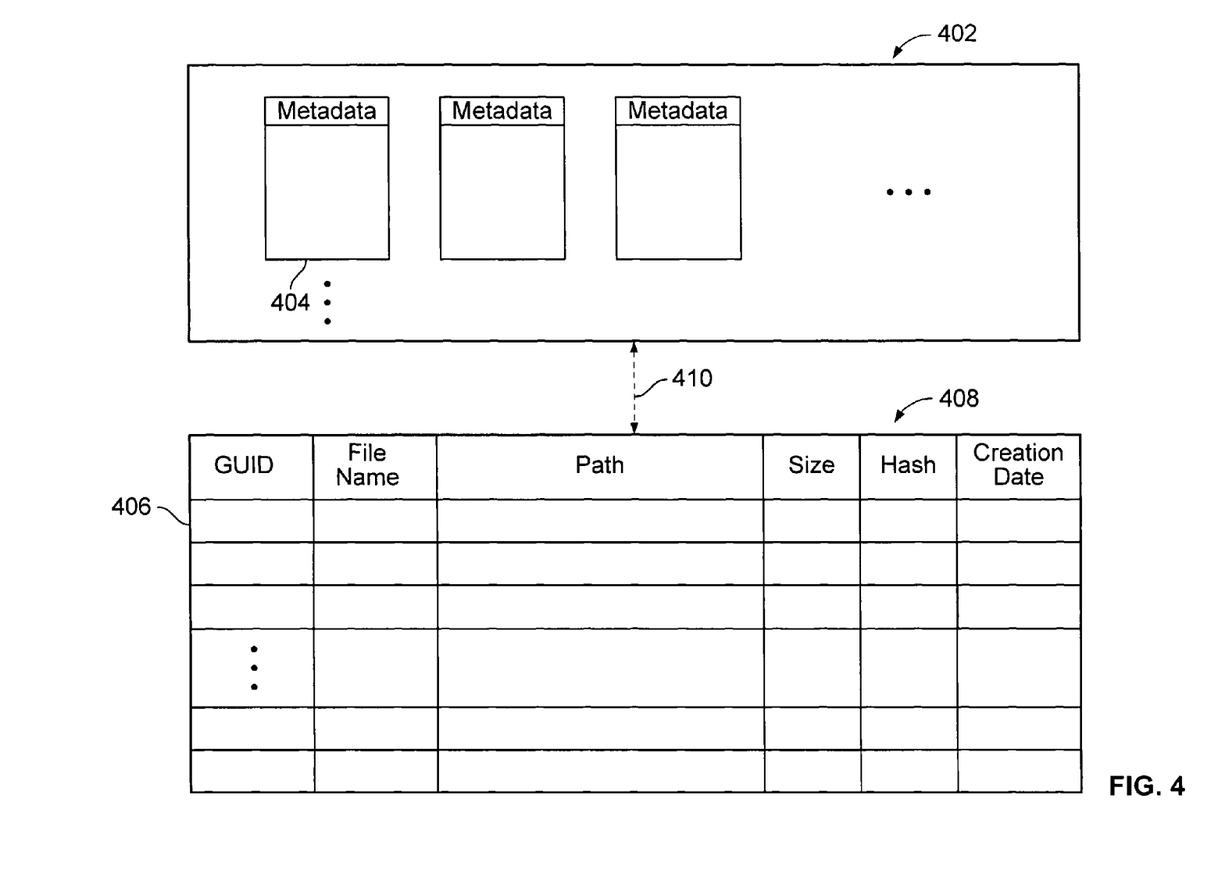
FIG. 4 illustrates an example of a set of files and an associated database employed to store information about the set of files.

FIG. 4 illustrates an example of a set of files and an associated database employed to store information about the set of files. As illustrated, a file system 402 includes a set of one or more files which may, for example, be organized in a hierarchical structure of directories. In some embodiments, file system 402 is populated by a set of files such as file 200 of FIG. 2. As shown, metadata is embedded in or attached to each file 404 in the file system 402. In some embodiments, metadata is assigned to a directory, for example, using ADS. In the given example, information about each file 404 is stored as a record 406 in a database 408. Alternatively, information about each file 404 may be stored at 408 using a table, another file system, or any other data structure that can be used to store file information. In some embodiments, database 408 is associated with a specific application, such as a photograph sharing or music sharing application. As indicated by link 410, the file attributes stored in each record 406 of database 408 are kept synchronized with the actual file attributes of an associated file 404.

When a database record is first created for a particular file, e.g., FileA, corresponding file attributes in the database record and the metadata of the file match with actual file attributes. However, suppose that subsequently FileA is copied to another file, FileB, outside of the database or application associated with the database, such as via the primary user interface of an operating system. The copy, FileB, includes the original metadata associated with FileA, i.e., the same GUID, the same original filename "FileA", the same original path of FileA, etc. By examining the metadata associated with FileB, it can be deduced that the metadata points to FileA rather than FileB, implying that if FileA still exists, FileB is a copy of FileA. In some embodiments, if FileB is a copy of FileA, a new record in the database is created for FileB, and the attributes in the metadata of FileB are updated as applicable. For example, FileB is assigned a new GUID, and the name and path fields are updated. In some embodiments, a pointer or reference to FileA (e.g., its GUID) is added to a version history field in the metadata and/or database record of FileB. In some cases, the metadata and/or database record of FileA is updated to include a pointer or reference to FileB (e.g., its GUID). If FileA, however, no longer exists, then FileB resulted from one of three cases: FileA was renamed to FileB; FileA was moved to FileB; or FileB is a copy of FileA, but FileA was deleted. In the cases where FileA no longer exists, the affected attributes in the metadata of FileB are updated as well as the affected fields in the database record that originally corresponded to FileA. For example, the file name and path in the metadata of FileB are updated as are the corresponding database fields. In some cases, the version history field of the metadata and/or the database record of FileB may be updated to record information indicating that FileB was originally named or derived from FileA.

Figure 5:
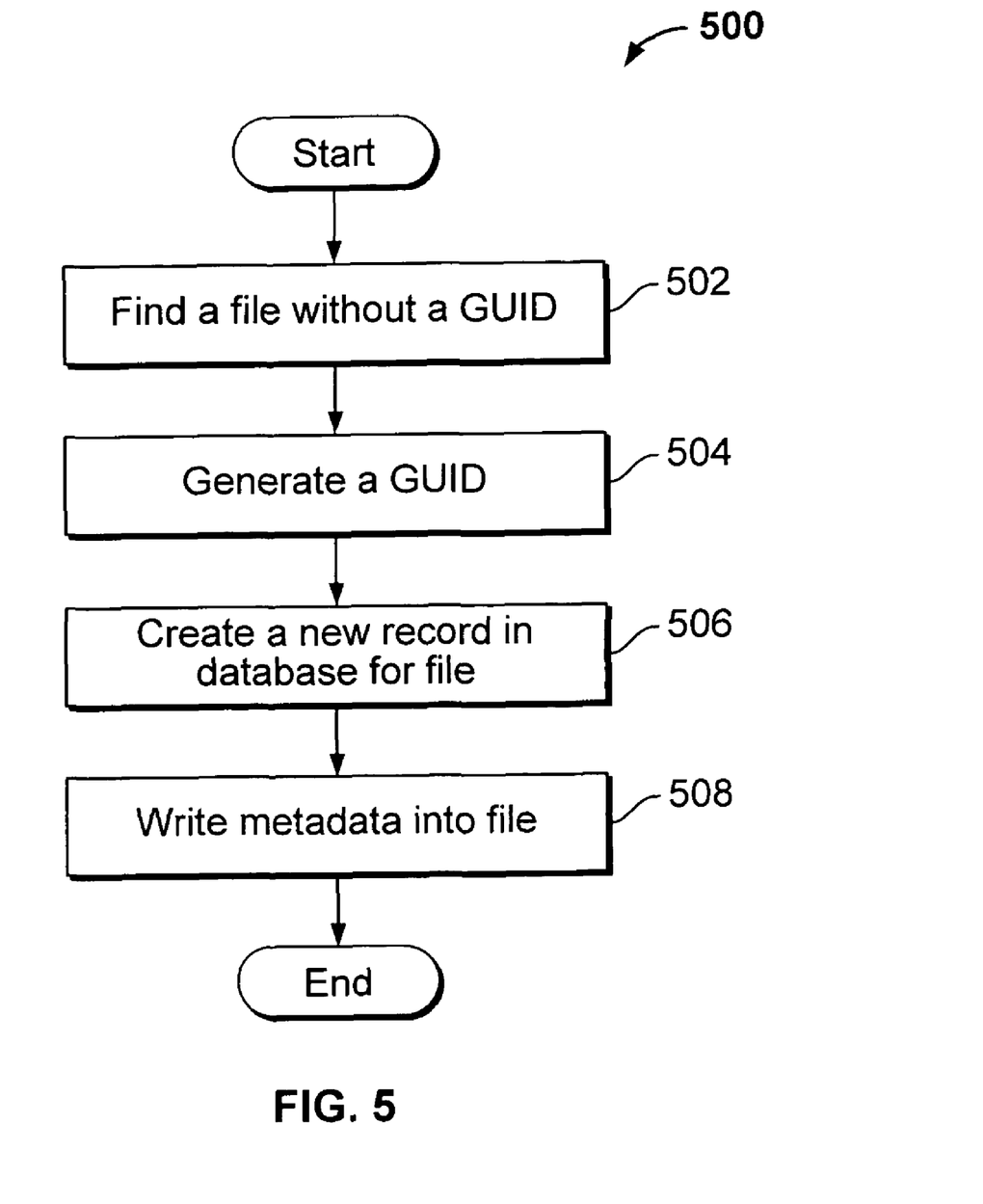
FIG. 5 illustrates an embodiment of a process for adding a new record to a database.

FIG. 5 illustrates an embodiment of a process for adding a new record to a database. In some embodiments process 500 is used to add information about a file into a new row of a table, a file system, and/or any other data structure used to store pointers and/or other relevant information used to manage file information. In some embodiments, process 500 is performed by an application associated with a database used to store information about files or certain types of files. At 502, a file without a GUID is found or encountered. In some embodiments, the file found at 502 is any file that has not been recorded in the database and that is not a copy or derived from a file already included in the database because in such a case the metadata associated with the file would have a GUID pointing to the file from which it was derived. In some embodiments, the file of 502 is a new file created using an application associated with the database. In some embodiments, 502 involves searching for files in other file systems, on disk, etc., that have not been already recorded in the database. In some embodiments, new files are searched for during a reconnection of the database, i.e., during a synchronization of database records with actual files that have already been recorded in the database. At 504, a GUID is generated for the file found at 502. Any appropriate technique may be used at 504 to generate the GUID. At 506, a new row or record is created in the database for the file found at 502. Attributes of the file found at 502, such as its assigned GUID, file name, path, etc., are employed to populate the fields associated with the database record at 506. At 508, at least some of the attributes recorded in the associated database record at 506 are also written into metadata associated with the file. For example, if the GUID, file name, and file path are recorded in the metadata of the file at 508, these attributes can be used to link the actual file with its corresponding database entry and to identify the file and/or any copies of the file if the file undergoes a change such as a move, rename, copy, content modification, etc.

Figure 6:
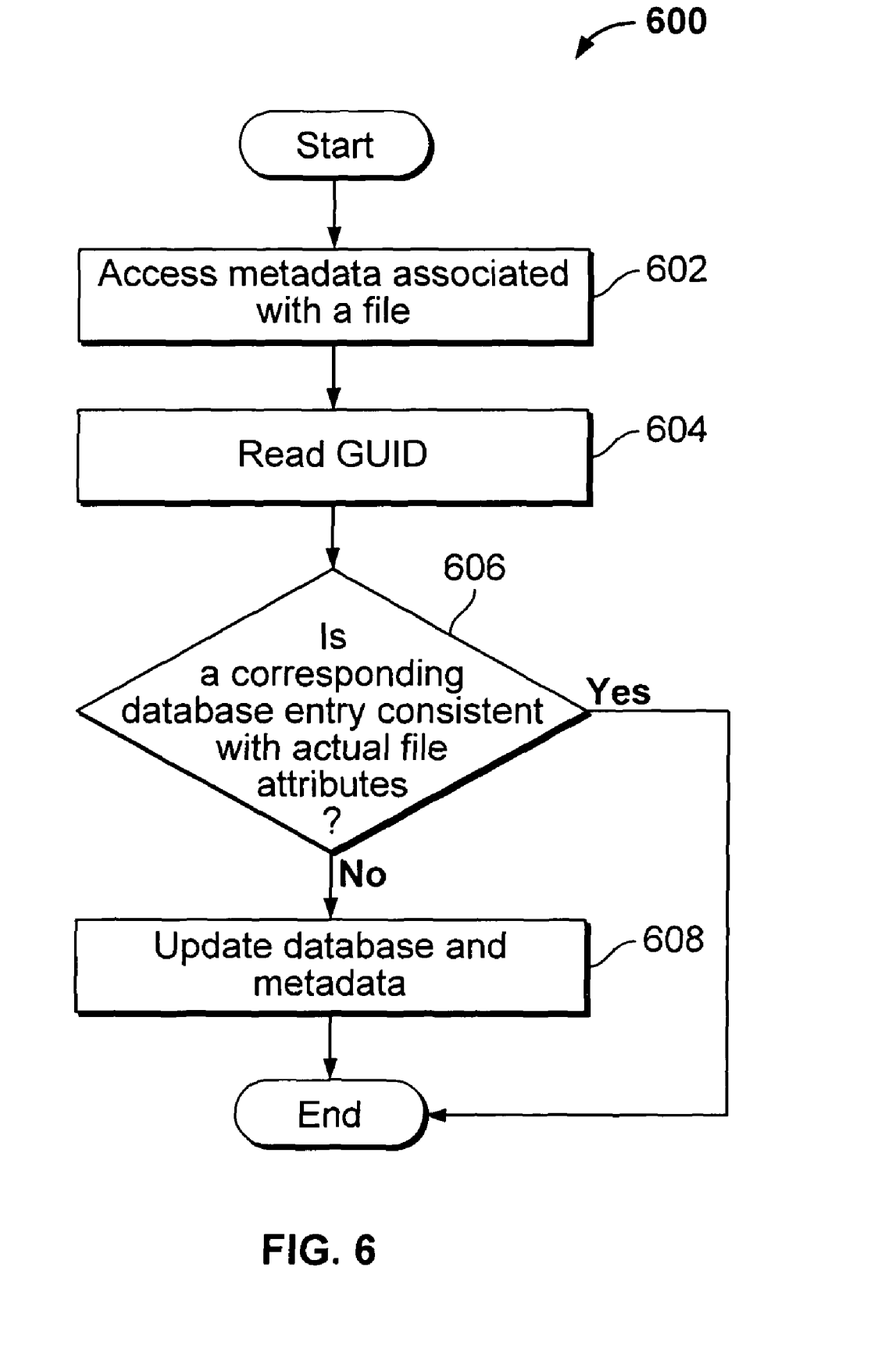
FIG. 6 illustrates an embodiment of a process for managing file information.

FIG. 6 illustrates an embodiment of a process for managing file information. Process 600 may be performed, for example, by a database, a database management system, an application associated with a database, or any other application employed to manage file information. In some embodiments, process 600 is periodically performed to keep the information in a database as well as in file metadata in synchronization with actual file information. At 602, metadata associated with a file is accessed. At 604, the GUID is read from the metadata accessed at 602. At 606 it is determined whether a corresponding database entry, i.e. an entry having the same GUID as that read at 604, is consistent with actual file attributes, e.g., file name, path, size, hash, etc. If it is determined at 606 that a corresponding database entry is consistent with actual file attributes, process 600 ends. If it is determined at 606 that one or more fields in a corresponding database entry are not consistent with corresponding file attributes, at 608 the affected database fields and metadata in the file are updated so that the information stored in the metadata associated with the file and the corresponding database record are consistent with actual file attributes. If the metadata accessed at 602 corresponds to that of a copy of a file already recorded in the database, in some embodiments, at 608 a new GUID is generated and a new database record is created for the copy, and the metadata in the copy is accordingly updated. Additionally, in some embodiments, the version history in the metadata and/or database entry of the original file from which the copy was derived is also updated at 608, e.g., to include a reference or pointer to the copy.

Figure 7:
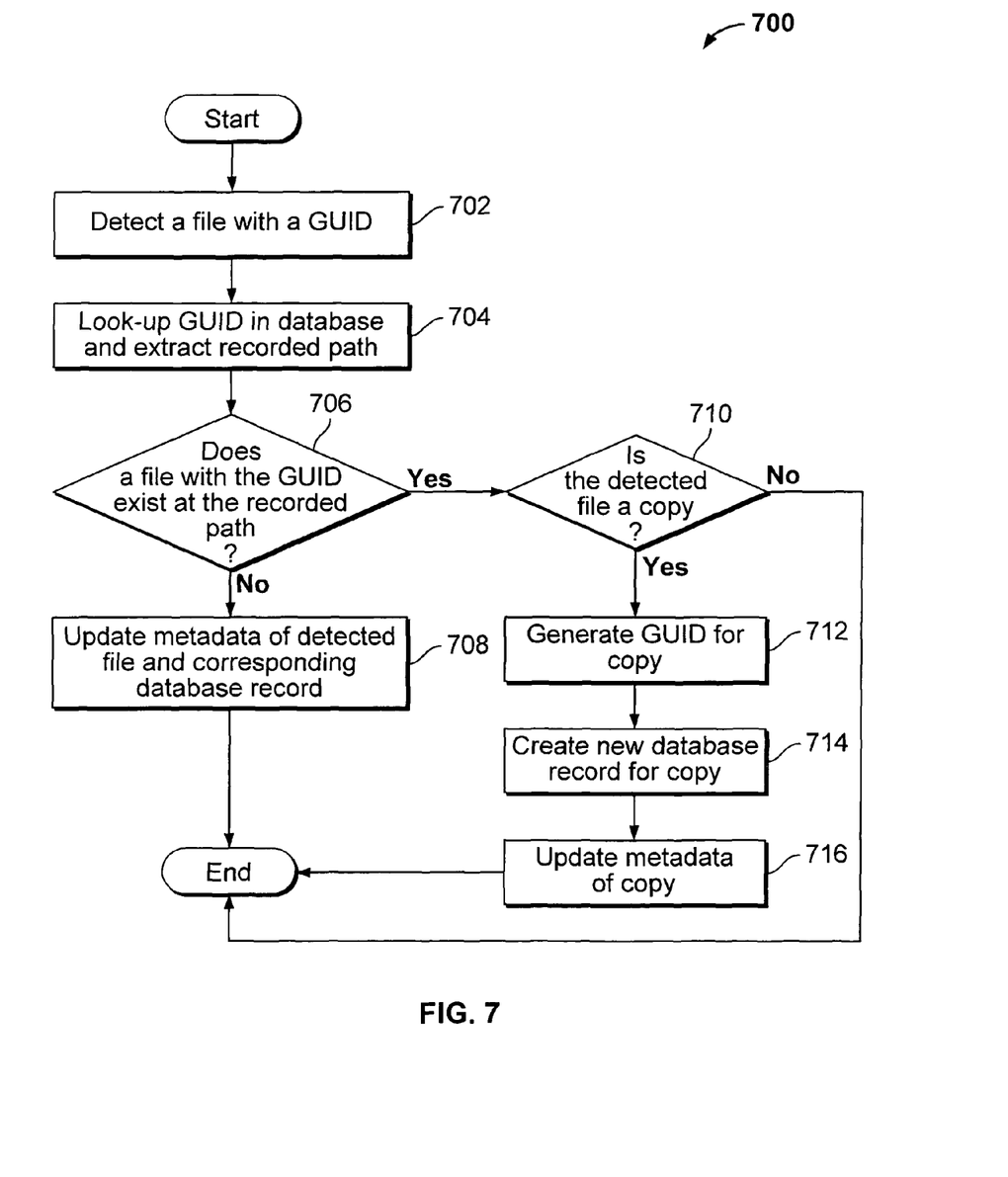
FIG. 7 illustrates an embodiment of a process for updating file metadata and an associated database entry when a file has undergone a change.

FIG. 7 illustrates an embodiment of a process for updating file metadata and an associated database entry when a file has undergone a change. In some embodiments, process 700 is used to determine whether a file has been moved, renamed, and/or copied. At 702, a file with a GUID is detected. At 704, the GUM is looked up in an associated database, and the recorded path is extracted. At 706 it is determined whether a file with the GUID exists at the recorded path. If it is determined at 706 that a file with the GUID does not exist at the recorded path, in some embodiments it can be deduced that the file detected at 702 corresponds to the original file associated with the database record and the GUID after it has undergone one or more changes, such as being moved, renamed, copied to another location and deleted from the recorded path, etc. Some of the file information recorded in the database (e.g., the path) may be outdated since the database was last updated. At 708 the corresponding database entry and the metadata of the file detected at 702 are updated. In some embodiments, at 708 any database field and/or metadata value that is not consistent with its corresponding actual file attribute is updated. For example, the content of an original file may have been modified, and then the file may have been moved to another directory. In this case, not only is the location information such as the file path updated at 708, but the file size, hash, modification date and/or time, and any other applicable attributes may also be updated at 708 so that the actual file attributes match corresponding entries in the file metadata and associated database fields.

If it is determined at 706 that a file with the GUID exists at the recorded path, it is determined at 710 whether the file detected at 702 is a copy. In some embodiments, it can be determined whether the detected file is a copy by checking whether the metadata associated with the file refers to another file (in which case it is a copy) or whether the metadata associated with the file matches actual file attributes (in which case it is not a copy). In some embodiments, it can be determined that the detected file is a copy if the path of the detected file is different from the recorded path extracted at 704, and another file with the same GUID exists at the recorded path extracted at 704. If it is determined at 710 that the detected file is not a copy, it can be deduced that the file detected at 702 has not been moved, renamed, and/or copied, and process 700 ends. In some embodiments, before process 700 ends after determining at 710 that the detected file is not a copy, one or more corresponding database and/or metadata entries of the file detected at 702 are updated to match actual file attributes, which may have changed, for example, if the content of the file has been modified. If it is determined at 710 that the file detected at 702 is a copy, a GUID is generated at 712 for the copy and a new record is created in the database for the copy at 714. At 716, the metadata of the copy is updated. For example, the GUID of the copy is updated to the GUID generated at 712. In some embodiments, the prior GUID of the copy (i.e. the GUID of the original file from which the copy was derived) is demoted to the version history field of the metadata and/or database record of the copy. Other file attribute values in the metadata of the copy are updated as applicable at 716 so that the metadata, like the corresponding database record, is synchronous with the actual attributes of the copy. In some embodiments, before process 700 ends, the metadata and/or database record of the original file from which the copy was derived is also updated, for example, to include a link or pointer (e.g., the GUID) of the copy in the version history field.

Figure 8:
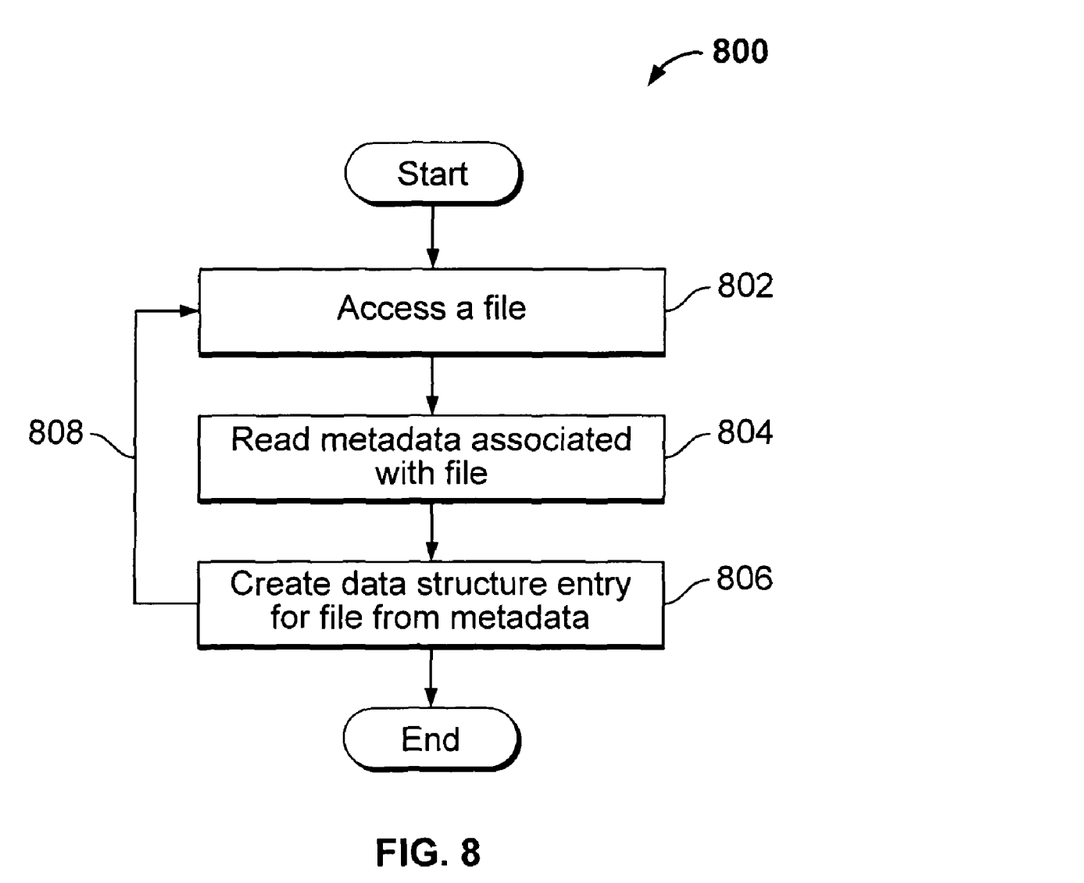
FIG. 8 illustrates an embodiment of a process for building a data structure.

FIG. 8 illustrates an embodiment of a process for building a data structure. Process 800 may be employed to build a table, a database, a file system, or any other applicable data structure that may be used, for example, to store and manage information related to a set of files. In some embodiments, process 800 is used to rebuild a corrupted database. At 802, a file is accessed. The file may be accessed from any appropriate storage medium, such as a disk. In some embodiments, the file is accessed at 802 via a network. At 804, the metadata associated with the file is read. At 806, a data structure entry for the file is created based at least in part on the metadata read at 804. For example, a database record may be created at 806 by using at least some of the values stored in the metadata of the file to populate corresponding database fields of the database record. As indicated by 808, process 800 may be repeated as many times as desired or as needed, as and when files become available. For example, if a data structure is to be created from a predetermined set of files, process 800 is repeated until each file has been added to the data structure.

Figure 9:
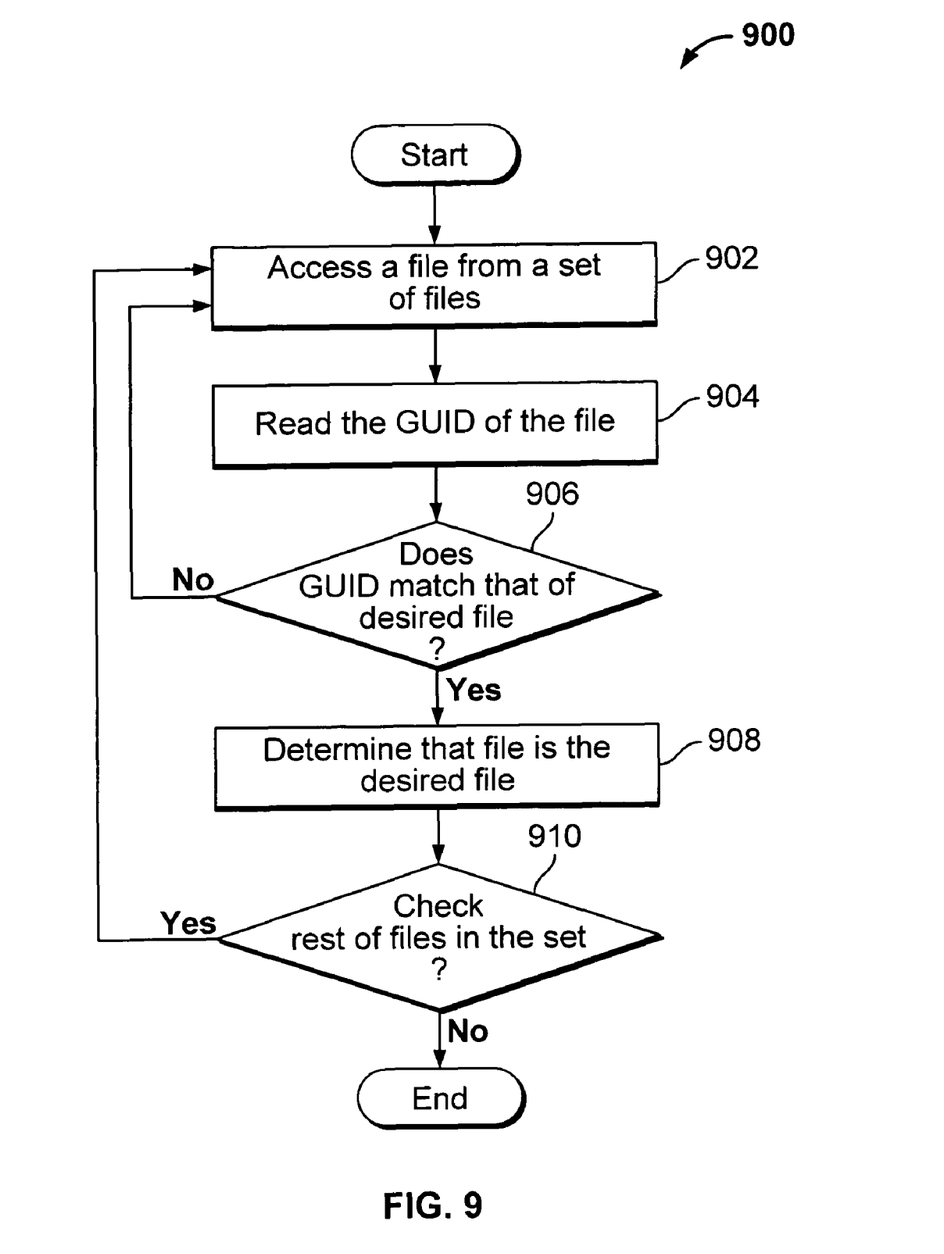
FIG. 9 illustrates an embodiment of a process for searching a set of files to access a desired file.

FIG. 9 illustrates an embodiment of a process for searching a set of files to access a desired file. Process 900 entails searching for the desired file using a persistent identifier associated with the desired file. In some embodiments, a persistent identifier is based on file content and/or other information associated with the file, such as at least a portion of the metadata associated with the file. In some embodiments, a persistent identifier is not merely a location, address, or pointer associated with the file, such as a URI, URL, or index in a file accessing system. In some embodiments, the persistent identifier is a GUID. Since the GUID is a persistent identifier that uniquely identifies a file, it provides sufficient identity information to access the desired file, for example, without requiring an index in a file accessing system, e.g., an address or pointer. At 902, a file is accessed from a set of files. The one or more files comprising the set of files may be on disk and/or some other forms of storage, stored across multiple computers in a network; etc. At 904, the GUID of the file accessed at 902 is read. At 906, it is determined whether the GUID read at 904 matches that of the desired file. If it is determined at 906 that the GUID read at 904 does not match that of the desired file, process 900 continues with 902 at which another file is accessed. If it is determined at 906 that the GUID read at 904 matches that of the desired file, at 908 it is determined that the file accessed at 902 is the desired file. In some embodiments, process 900 optionally includes 910 at which it is determined whether to check the rest of the files in the set. If it is determined at 910 to check the rest of the files in the set, process 900 returns to 902 and continues with another file that has not already been checked. In some embodiments, it can be determined that multiple copies exist if a plurality of files with the same GUID are found using process 900. In some embodiments, if information about the files is recorded in an application and/or associated database, when multiple files with the same GUID are found, only a single file is selected to be associated with that GUID, a new GUID is generated for each of the other files, a new record is created for each new GUID and its associated file, and the metadata of each file is accordingly updated. If at 910 it is determined not to check the rest of the files in the set, process 900 ends. In some embodiments, if all of the files have been checked in the set of files and the desired file is not found, it can be inferred that the desired file has been deleted. In some embodiments, if it is determined that a file has been deleted, an associated database entry of the file is purged. In some embodiments, if all of the files have been checked in the set of files and the desired file is not found, it can be inferred that at least the GUID in the metadata of the desired file has been cleared. In the cases where the GUID and possibly other metadata of a file have been cleared, the path may be employed to maintain the association between the file and its corresponding database record.

As described herein, information stored in a database record for a file can be kept synchronized with information associated with the actual file by assigning the same unique identifier (e.g., the GUID) to the database record as well as to the file itself. The GUID is persistently stored in metadata associated with the file and uniquely identifies the file. In addition to the GUID, the metadata of the file may include other information associated with the file. Comparing one or more of actual file attributes, information in an associated database record, information in the file metadata, information in the metadata of other files, the existence of other files, etc., allows inferences about the manner in which a file has changed to be made. By providing the capability to uniquely identify a file from its GUID and other relevant metadata, the improved management of file information is possible.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer implemented method comprising:
    searching a set of files for a first file associated with a persistent identifier;
    identifying the first file associated with the persistent identifier, the persistent identifier uniquely identifying the first file within the set of files, and the persistent identifier identifying a database record of the first file that includes one or more attributes of the first file, wherein the persistent identifier is embedded in the first file in a persistent manner so that the persistent identifier is associated with the file across file operations and operating systems;
    determining whether at least one value in the database record of the first file does not correspond with one or more attributes of the file including by:
        accessing the database record associated with the first file to obtain a recorded location, wherein the recorded location is different from a location at which the first file is located;
        determining whether there exists at the recorded location a second file which includes said persistent identifier; and
        in the event it is determined there exists at the recorded location a second file which includes said persistent identifier, determining whether the first file is a copy of the second file; and
    maintaining a database for managing file information including by:
        in the event it is determined there exists at the recorded location a second file which includes said persistent identifier and it is determined the first file is a copy of the second file:
            creating a second database record associated with the first file;
            generating a second persistent identifier which uniquely identifies the first file;
            updating the persistent identifier embedded in the first file to be the second persistent identifier; and
            storing the second database record, including by storing in the second database record the second persistent identifier; and
        in the event it is determined there exists at the recorded location no second file which includes said persistent identifier, updating the recorded location of the database record associated with the first file to be the location at which the first file is located.

2. A computer implemented method as recited in claim 1, wherein the persistent identifier comprises a globally unique identifier (GUID).

3. A computer implemented method as recited in claim 1, wherein the first file is associated with a photograph sharing or music sharing application.

4. A computer implemented method as recited in claim 1, wherein in the event it is determined there exists at the recorded location a second file which includes said persistent identifier further includes recording the first identifier in a version history.

5. A computer implemented method as recited in claim 1, wherein the database record associated with the first file further includes one or more of the following: a file name, path, size, hash, creation date, creation time, version history, modification date, modification time, author, and keywords.

6. A computer implemented method as recited in claim 1, wherein the persistent identifier is embedded in the first file using Adobe Extensible Metadata Platform (XMP) and first file is able to be modified using Microsoft Windows Explorer.

7. A computer implemented method comprising:
    accessing a first set of information associated with a first file stored in a database record which includes one or more attributes of the first file, wherein the first set of information includes a persistent identifier, the persistent identifier uniquely identifies the first file within a set of files, the persistent identifier identifies the database record of the first file that includes one or more attributes of the first file, and the persistent identifier is embedded in the first file in a persistent manner so that the persistent identifier is associated with the file across file operations and operating systems;
    reading the persistent identifier from the first set of information stored in the database record;
    determining whether at least one value in the database record of the first file does not correspond with one or more attributes of the file including by:
        accessing the database record associated with the first file to obtain a recorded location, wherein the recorded location is different from a location at which the first file is located;
        determining whether there exists at the recorded location a second file which includes said persistent identifier; and
        in the event it is determined there exists at the recorded location a second file which includes said persistent identifier, determining whether the first file is a copy of the second file; and
    maintaining a database for managing file information including by:
        in the event it is determined there exists at the recorded location a second file which includes said persistent identifier and it is determined the first file is a copy of the second file:
            creating a second database record associated with the first file;
            generating a second persistent identifier which uniquely identifies the first file;
            updating a persistent identifier embedded in the first file to be the second persistent identifier; and
            storing the second database record, including by storing in the second database record the second persistent identifier; and
        in the event it is determined there exists at the recorded location no second file which includes said persistent identifier, updating the recorded location of the database record associated with the first file to be the location at which the first file is located.

8. A computer implemented method as recited in claim 7, wherein in the event it is determined there exists at the recorded location a second file which includes said persistent identifier further includes recording the first identifier in a version history.

9. A computer implemented method as recited in claim 7, wherein the persistent identifier comprises a globally unique identifier (GUID).

10. A computer implemented method as recited in claim 7, wherein the first set of information is associated with one or more of the following: Extensible Metadata Platform (XMP), a header of the file, an Alternate Data Stream (ADS), a resource fork, a data structure used to record and manage file information, a photograph sharing or music sharing application, a row in a table, a record in a database, a record in a file system.

11. A computer implemented method as recited in claim 7, wherein the first set of information includes one or more of a file name, path, size, hash, creation date, creation time, version history, modification date, modification time, author, and keywords.

12. A computer implemented method as recited in claim 7, wherein the first set of information is associated with a data structure used to record and manage file information.

13. A computer implemented method as recited in claim 7, wherein the first set of information is associated with a photograph sharing or music sharing application.

14. A computer implemented method as recited in claim 7, wherein the first set of information is associated with one or more of a row in a table, a record in a database, and a record in a file system.

15. A computer implemented method as recited in claim 7, wherein the persistent identifier is embedded in the first file using Adobe Extensible Metadata Platform (XMP) and first file is able to be modified using Microsoft Windows Explorer.

16. A system comprising:
a processor configured to:
search a set of files for a first file associated with a persistent identifier;
identify the first file associated with the persistent identifier, the persistent identifier uniquely identifying the first file within the set of files, and the persistent identifier identifying a database record of the first file that includes one or more attributes of the first file, wherein the persistent identifier is embedded in the first file in a persistent manner so that the persistent identifier is associated with the file across file operations and operating systems;
determine whether at least one value in the database record of the first file does not correspond with one or more attributes of the file including by:
accessing the database record associated with the first file to obtain a recorded location, wherein the recorded location is different from a location at which the first file is located;
determining whether there exists at the recorded location a second file which includes said persistent identifier; and
in the event it is determined there exists at the recorded location a second file which includes said persistent identifier, determining whether the first file is a copy of the second file; and
maintain a database for managing file information including by:
in the event it is determined there exists at the recorded location a second file which includes said persistent identifier and it is determined the first file is a copy of the second file:
create a second database record associated with the first file;
generate a second persistent identifier which uniquely identifies the first file;
update the persistent identifier embedded in the first file to be the second persistent identifier; and
store the second database record, including by storing in the second database record the second persistent identifier; and
in the event it is determined there exists at the recorded location no second file which includes said persistent identifier, update the recorded location of the database record associated with the first file to be the location at which the first file is located; and
a memory coupled with the processor, wherein the memory provides the processor with instructions.

17. A system as recited in claim 16, wherein the first file is associated with a photograph sharing or music sharing application.

18. A system as recited in claim 16, wherein in the event it is determined there exists at the recorded location a second file which includes said persistent identifier, the processor is further configured to recording the first identifier in a version history.

19. A system as recited in claim 16, wherein the database record associated with the first file further includes one or more of the following: a file name, path, size, hash, creation date, creation time, version history, modification date, modification time, author, and keywords.

20. A system as recited in claim 16, wherein the persistent identifier is embedded in the first file using Adobe Extensible Metadata Platform (XMP) and first file is able to be modified using Microsoft Windows Explorer.

21. A system comprising:
a processor configured to:
access a first set of information associated with a first file stored in a database record which includes one or more attributes of the first file, wherein the first set of information includes a persistent identifier, the persistent identifier uniquely identifies the first file within a set of files, the persistent identifier identifies the database record of the first file that includes one or more attributes of the first file, and the persistent identifier is embedded in the first file in a persistent manner so that the persistent identifier is associated with the file across file operations and operating systems;
read the persistent identifier from the first set of information stored in the database record;
determine whether at least one value in the database record of the first file does not correspond with one or more attributes of the file including by:
access the database record associated with the first file to obtain a recorded location, wherein the recorded location is different from a location at which the first file is located;
determine whether there exists at the recorded location a second file which includes said persistent identifier; and
in the event it is determined there exists at the recorded location a second file which includes said persistent identifier, determine whether the first file is a copy of the second file; and
maintain a database for managing file information including by:
in the event it is determined there exists at the recorded location a second file which includes said persistent identifier and it is determined the first file is a copy of the second file:
create a second database record associated with the first file;

generate a second persistent identifier which uniquely identifies the first file;

update a persistent identifier embedded in the first file to be the second persistent identifier; and store the second database record, including by storing in the second database record the second persistent identifier; and in the event it is determined there exists at the recorded location no second file which includes said persistent identifier, update the recorded location of the database record associated with the first file to be the location at which the first file is located; and a memory coupled with the processor, wherein the memory provides the processor with instructions.

22. A system as recited in claim 21, wherein the first file is associated with a photograph sharing or music sharing application.

23. A system as recited in claim 21, wherein in the event it is determined there exists at the recorded location a second file which includes said persistent identifier, the processor is further configured to recording the first identifier in a version history.

24. A system as recited in claim 21, wherein the database record associated with the first file further includes one or more of the following: a file name, path, size, hash, creation date, creation time, version history, modification date, modification time, author, and keywords.

25. A system as recited in claim 21, wherein the persistent identifier is embedded in the first file using Adobe Extensible Metadata Platform (XMP) and first file is able to be modified using Microsoft Windows Explorer.

26. A computer program product, the computer program product being embodied in a computer readable storage device and comprising computer instructions for:

searching a set of files for a first file associated with a persistent identifier;

identifying the first file associated with the persistent identifier, the persistent identifier uniquely identifying the first file within the set of files, and the persistent identifier identifying a database record of the first file that includes one or more attributes of the first file, wherein the persistent identifier is embedded in the first file in a persistent manner so that the persistent identifier is associated with the file across file operations and operating systems;

determining whether at least one value in the database record of the first file does not correspond with one or more attributes of the file including by:

accessing the database record associated with the first file to obtain a recorded location, wherein the recorded location is different from a location at which the first file is located;

determining whether there exists at the recorded location a second file which includes said persistent identifier;

in the event it is determined there exists at the recorded location a second file which includes said persistent identifier, determining whether the first file is a copy of the second file; and maintaining a database for managing file information including by:

in the event it is determined there exists at the recorded location a second file which includes said persistent identifier and it is determined the first file is a copy of the second file:

creating a second database record associated with the first file;

generating a second persistent identifier which uniquely identifies the first file;

updating the persistent identifier embedded in the first file to be the second persistent identifier; and storing the second database record, including by storing in the second database record the second persistent identifier; and in the event it is determined there exists at the recorded location no second file which includes said persistent identifier, updating the recorded location of the database record associated with the first file to be the location at which the first file is located.

27. A computer program product as recited in claim 26, wherein the first file is associated with a photograph sharing or music sharing application.

28. A computer program product as recited in claim 26, wherein the computer instructions for in the event it is determined there exists at the recorded location a second file which includes said persistent identifier further includes computer instructions for recording the first identifier in a version history.

29. A computer program product as recited in claim 26, wherein the database record associated with the first file further includes one or more of the following: a file name, path, size, hash, creation date, creation time, version history, modification date, modification time, author, and keywords.

30. A computer program product as recited in claim 26, wherein the persistent identifier is embedded in the first file using Adobe Extensible Metadata Platform (XMP) and first file is able to be modified using Microsoft Windows Explorer.

31. A computer program product, the computer program product being embodied in a computer readable storage device and comprising computer instructions for:

accessing a first set of information associated with a first file stored in a database record which includes one or more attributes of the first file, wherein the first set of information includes a persistent identifier, the persistent identifier uniquely identifies the first file within a set of files, the persistent identifier identifies the database record of the first file that includes one or more attributes of the first file, and the persistent identifier is embedded in the first file in a persistent manner so that the persistent identifier is associated with the file across file operations and operating systems;

reading the persistent identifier from the first set of information stored in the database record;

determining whether at least one value in the database record of the first file does not correspond with one or more attributes of the file including by:

accessing the database record associated with the first file to obtain a recorded location, wherein the recorded location is different from a location at which the first file is located;

determining whether there exists at the recorded location a second file which includes said persistent identifier; and in the event it is determined there exists at the recorded location a second file which includes said persistent identifier, determining whether the first file is a copy of the second file; and maintaining a database for managing file information including by:

in the event it is determined there exists at the recorded location a second file which includes said persistent identifier and it is determined the first file is a copy of the second file:
- creating a second database record associated with the first file;
- generating a second persistent identifier which uniquely identifies the first file;
- updating a persistent identifier embedded in the first file to be the second persistent identifier; and
- storing the second database record, including by storing in the second database record the second persistent identifier; and in the event it is determined there exists at the recorded location no second file which includes said persistent identifier, updating the recorded location of the database record associated with the first file to be the location at which the first file is located.

32. A computer program product as recited in claim 31, wherein the first file is associated with a photograph sharing or music sharing application.

33. A computer program product as recited in claim 31, wherein the computer instructions for in the event it is determined there exists at the recorded location a second file which includes said persistent identifier further includes computer instructions for recording the first identifier in a version history.

34. A computer program product as recited in claim 31, wherein the database record associated with the first file further includes one or more of the following: a file name, path, size, hash, creation date, creation time, version history, modification date, modification time, author, and keywords.

35. A computer program product as recited in claim 31, wherein the persistent identifier is embedded in the first file using Adobe Extensible Metadata Platform (XMP) and first file is able to be modified using Microsoft Windows Explorer.

* * * * *